(12) United States Patent
Evans et al.

(10) Patent No.: US 6,795,967 B1
(45) Date of Patent: Sep. 21, 2004

(54) CHANGING USER IDENTITIES WITHOUT CLOSING APPLICATIONS

(75) Inventors: Christopher A. Evans, Redmond, WA (US); Christopher T. Sager, Stanwood, WA (US); Darren Mitchell, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/238,133

(22) Filed: Jan. 26, 1999

(51) Int. Cl.$^7$ ................................................. G06F 3/00
(52) U.S. Cl. ...................... 719/310; 719/320; 717/121
(58) Field of Search ................................ 345/744, 762, 345/733; 713/100, 200; 709/221, 226, 329, 310, 320; 717/168–178, 121; 719/310, 320

(56) References Cited

U.S. PATENT DOCUMENTS

| | | | |
|---|---|---|---|
| 5,115,501 A | 5/1992 | Kerr | 395/600 |
| 5,327,529 A | 7/1994 | Fults et al. | 395/155 |
| 5,410,703 A | 4/1995 | Nilsson et al. | 395/700 |
| 5,544,321 A | 8/1996 | Theimer et al. | 395/200.11 |
| 5,600,776 A | 2/1997 | Johnson et al. | 395/326 |
| 5,606,702 A | 2/1997 | Diel et al. | 395/682 |
| 5,675,753 A | 10/1997 | Hansen et al. | 395/333 |
| 5,684,952 A | 11/1997 | Stein | 395/200.1 |
| 5,771,381 A | 6/1998 | Jones et al. | 395/653 |
| 5,781,724 A | 7/1998 | Nevarez et al. | 395/186 |
| 5,784,563 A | 7/1998 | Marshall et al. | 395/200.51 |
| 6,023,704 A * | 2/2000 | Gerard et al. | 707/103 R |
| 6,275,851 B1 * | 8/2001 | Cromer et al. | 709/217 |

OTHER PUBLICATIONS

Gunther Born, "Inside The Microsoft Wiondows98® Registry", Microsoft Press®, entire book (1998).
Greg Holden, "Win 98 Registry Little Black Book", Coriolis Group of International Thomson Publishing Co., entire book (1998).
"Microsoft WindowsNT® Workstation Resource Kit", Microsoft Press®, entire book (1996).
Dale Rogerson, "Inside COM—Microsoft's Component Object Model", Microsoft Press®, entire book (1997).

* cited by examiner

*Primary Examiner*—St. John Courtenay, III
*Assistant Examiner*—Van Hoa Nguyen
(74) *Attorney, Agent, or Firm*—Woodcock Washburn LLP

(57) ABSTRACT

An operating system registry contains multiple "identities." One of these identities is designated the current identity. An application executing on a multitasking computer system uses information stored in the current identity to configure the application, for example to provide a user-specific user interface. When an application opens, it registers with an identity manager using objects known as "connection points." To switch identities, a user supplies the name of an identity to switch to. The identity manager then uses the registered connection points to query each of the applications for permission to switch identities. If all the registered connection points grant permission to switch identities, then the identity manager switches the current identity by changing information in the registry. The identity manager then notifies all applications, via their registered connection points, that a change to the registry has been made so that the applications can take appropriate action.

12 Claims, 8 Drawing Sheets

REGISTRY HIERARCHY

IDENTITY-MANAGER LOGON PROCESS

CONNECTION-POINT REGISTRATION PROCESS

IDENTITY-CHANGE PROCESS

CONNECTION-POINT UNREGISTRATION PROCESS

CHANGING USER IDENTITIES WITHOUT CLOSING APPLICATIONS

BACKGROUND INFORMATION

A computer, such as a personal computer, involves hardware and software. The software typically involves computer programs called "applications" and an "operating system." The applications assist in the performance of specific tasks, such as word-processing, accounting, or inventory management. The operating system allocates the hardware resources of the computer among the various application programs. An example of an application is "OUTLOOK" Express, a contact database and communication tool available from Microsoft Corporation. Versions of "OUTLOOK" Express are available for use with different operating systems. For example, one version of "OUTLOOK" Express operates with the MAC OS 8 operating system available from Apple Computer Corporation, whereas another version of "OUTLOOK" Express operates with the "WINDOWS NT" operating system ("WINDOWS NT") available from Microsoft Corporation.

FIG. 1 (Prior Art) is a simplified diagram of a computer screen 100 of a computer executing the "OUTLOOK" Express application program. Numerous icons, such as icons 110, appear on the screen. Each icon is associated with a different function. Icon 140 may, for example, retrieve the user's mail and cause it to be displayed on the screen as a list of messages 150. A user uses a mouse 130 to select and activate an icon.

Consider a situation where two users want to read their mail using the version of "OUTLOOK" Express that operates with the Apple operating system. An address book application (e.g., the Now Contact application available from Qualcomm, Incorporated) is also running on the computer in another window. First, one user opens the "OUTLOOK" Express application, to read his mail for example. "OUTLOOK" Express prompts him for some personal identifier and then configures itself according to some previously defined user-specific settings. For example, "OUTLOOK" Express offers the user access to his own mail, contact list, and files. Then, after the first user is finished, the second user logs into the same "OUTLOOK" Express application using her personal identifier. "OUTLOOK" Express then reconfigures itself according to her previously defined settings. Mail subsequently retrieved using "OUTLOOK" Express is then mail directed to the second user. This change of user-specific settings does not require either of the two applications ("OUTLOOK" Express and the Qualcomm address book) be closed and restarted, but the change is limited to the "OUTLOOK" Express application. It is desired to be able to make one switch that would simultaneously affect multiple applications running on the computer (for example, the "OUTLOOK" Express application and the Qualcomm address book application).

Consider another situation where the same two users want to read their respective mail using the "WINDOWS NT" version of "OUTLOOK" Express. "WINDOWS NT" allows a computer to support different "profiles," each of which defines a particular user work-environment. Returning to the scenario in which two users share "OUTLOOK" Express, the first user could log into "WINDOWS NT" using a first profile. "OUTLOOK" Express, when opened, would then configure itself according to user-specific data associated with the first user's profile. Thus, mail accessed would be the mail of the first user. Further, unlike the situation with the Apple operating system described above, multiple applications running on the "WINDOWS NT" operating system could receive user-specific settings from the new profile.

The second user could switch to her own profile so that she would be presented with her own mail when using "OUTLOOK" Express. Other profile-dependent programs would also configure themselves according to her previously defined preferences. Unfortunately, changing profiles in "WINDOWS NT" requires that all open applications be closed and reopened. This can be particularly burdensome when applications that maintain a dial-up network connection (such as "OUTLOOK" Express) must be closed. Closing the "OUTLOOK" Express application causes the dial-up network connection used by the program to be lost. Once lost, it may be difficult and time consuming to reestablish this dial-up connection.

In summary, the Apple operating system version of "OUTLOOK" Express allows user-specific settings to be changed within an application without exiting the application, but this change of settings only affects one application. "WINDOWS NT" allows user-specific settings to be changed for multiple applications but all open applications must be closed and then reopened in order to make the change.

SUMMARY

The present invention addresses the above problems by providing an identity manager. The identity manager allows multiple users to share a single computer. Each user can uniquely benefit from the flexibility and personalization features of different applications by configuring each application to his or her liking. Configuration settings of all identity-aware applications are changed by simply notifying the computer of a change in identity of the user. One need not log out of or close down applications and reopen them under a different identity to change the user work environment.

An operating system registry contains multiple "identities." One of these identities is designated the current identity. An application executing on a multitasking computer system uses information stored in the current identity, for example, to configure the application's user interface in a particular way. When an application opens, it registers with an identity manager. If the application has multiple threads, each of the threads may register. These registrations are made using objects conventionally known as "connection points."

To switch identities, the user supplies the name of an identity to switch to. The identity manager uses the registered connection points to query each of the applications for permission to switch identities. If all the registered connection points grant permission to switch identities, then the identity manager switches the current identity by changing information in the registry. The identity manager then notifies all applications via their registered connection points that a change has been made so that the applications can take appropriate action. Applications may, for example, retrieve information stored in the new current identity and reconfigure the application's user interface in a different way. Accordingly, the identity used by multiple applications can be changed from a first identity to a second identity without closing any of the multiple applications. Where one of the applications maintains and uses a network connection (for example, a dial-up connection to the Internet), loss of the connection due to having to close the application when switching profiles is avoided. Applications that do not use identity-specific information do not register, are not queried, and are not affected by the change of identities.

This summary does not purport to define the invention. The invention is defined by the claims.

DETAILED DESCRIPTION

Figure 1:
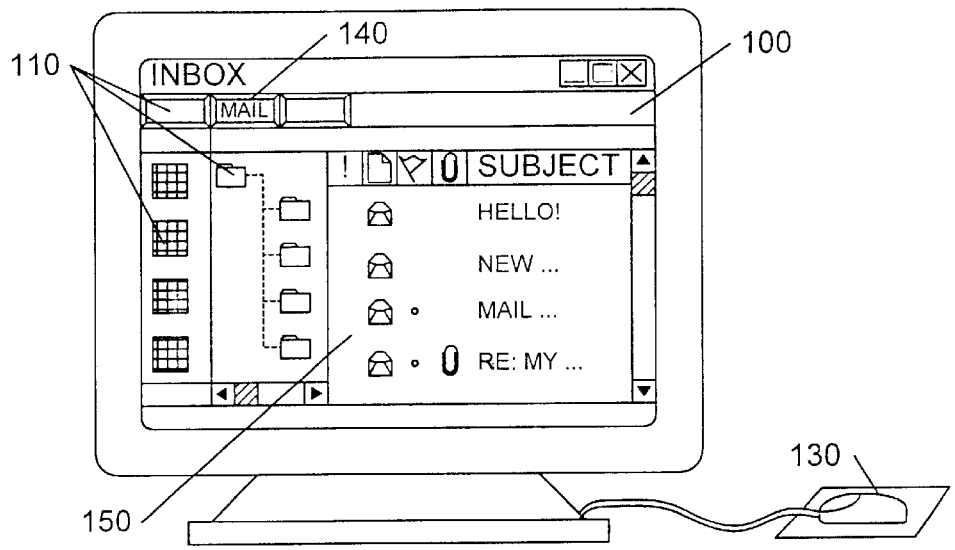
FIG. 1 (Prior Art) is a simplified diagram of a computer screen executing the "OUTLOOK" Express application program.
Figure 2:
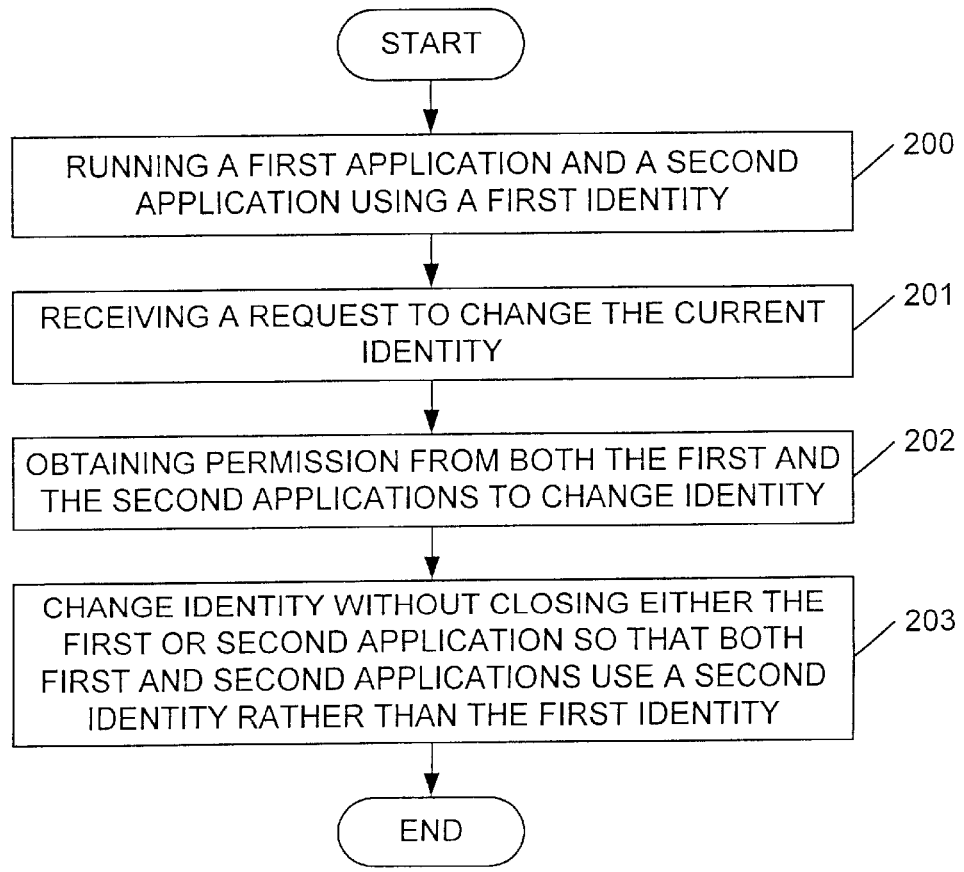
FIG. 2 is a flowchart of a method in accordance with an embodiment in which an identity used by two simultaneously running applications is changed from a first identity to a second identity without closing either of the applications.

FIG. 2 is a flowchart of a method for switching user identities in accordance with one embodiment of the invention. In a first step (step 200), a first application and a second application are running simultaneously on a multitasking computer system so that they both use a first identity. An identity may, for example, be a collection of work-environment settings stored in a central repository that both the first application and the second application can access to configure a user's work-environment. Work-environment settings include settings that:

a) restrict access to certain information and/or programs,
b) grant access to certain information and/or programs,
c) change the appearance of the desktop including colors and the existence and function of icons,
d) change the content and existence of menus and toolbars,
e) establish and control network connections including dial-up network connections,
f) implement passwords and security features,
g) control the automatic launch of certain programs, and
h) store internet account information, such as server names and account passwords.

Work-environment settings may include "OUTLOOK" Express email passwords and inbox locations. The list above is not exhaustive. Other types of work-environment settings may be present in an identity.

In a second step (step 201), a request is received to change the current identity. This request can be received, for example, by one of the applications due to a user interacting with a user interface. The user may, for example, select a "change identities" icon on the computer screen.

In a third step (step 202), permission is obtained from both the first and second applications to change the current identity. The first and second applications may, for example, communicate this permission to change the current identity using objects called "connection points" in accordance with the COM (Microsoft's Component Object Model) approach to object oriented programming.

In a fourth step (step 203), the current identity is changed so that the first and second applications use a second identity, rather than the first identity, to configure the computer work-environment. This change of identity is accomplished without closing either application.

Figure 3:
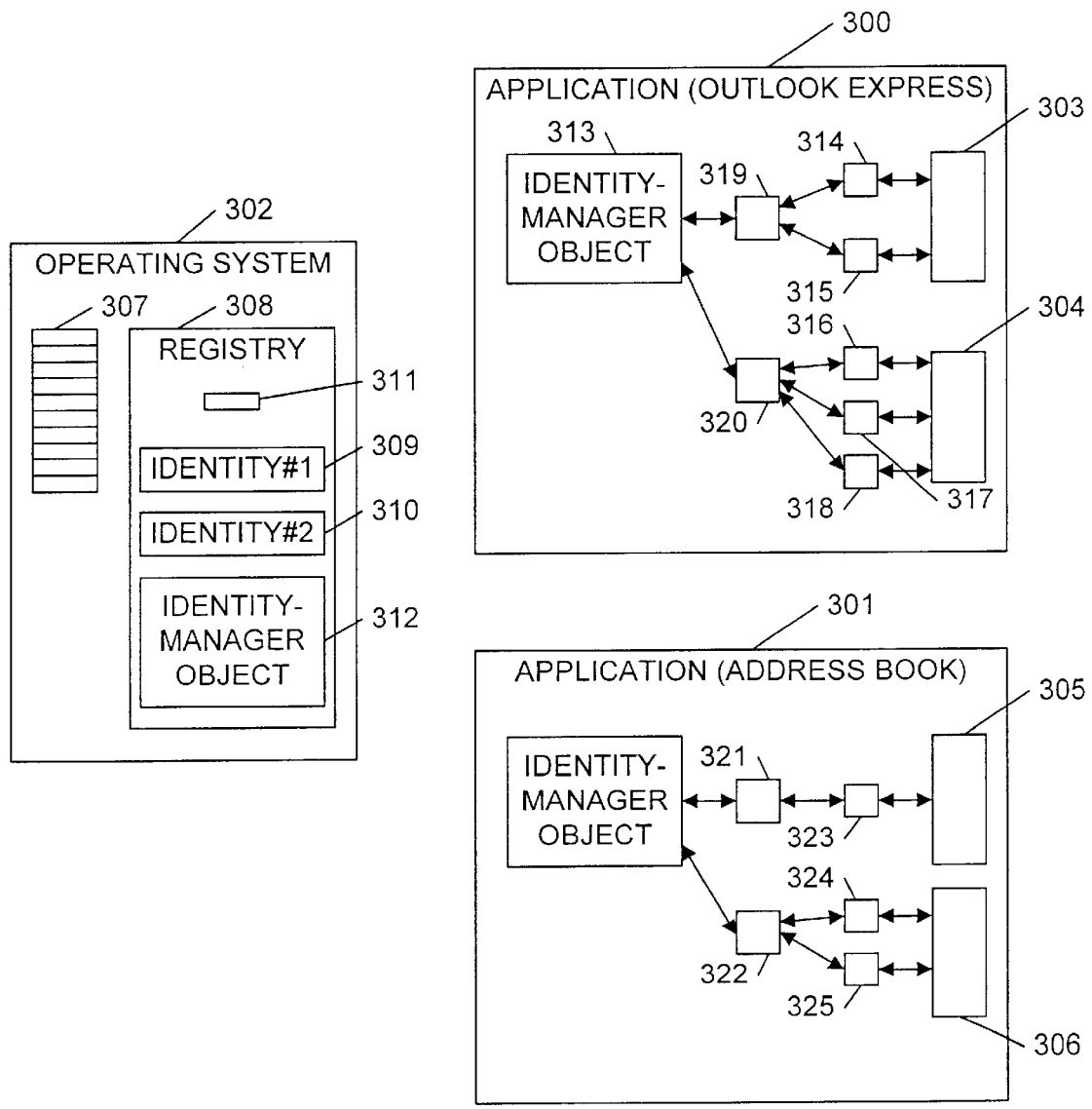
FIG. 3 is a block diagram of a computer system in accordance with some embodiments of the invention.

FIG. 3 is a more detailed block diagram in accordance with some embodiments of the invention. This block diagram illustrates a computer system that includes a first application 300, a second application 301, and an operating system 302. In the present example, operating system 302 is "WINDOWS NT". Applications 300 and 301 can contain one or more parts, or "threads." First application 300 could, for example, be the "OUTLOOK" Express program and may contain two threads 303 and 304. The second application could, for example, be the "WINDOWS" Address Book program and may also contain two threads 305 and 306. Each thread executes in a separate address space. In a multitasking system, multiple threads can be executing at the same time.

Operating system 302 maintains a global database 308, called the "registry," and a list 307 of handles to all windows that are open. Registry 308 contains multiple profiles of configuration data as well as a pointer that points to the profile currently in use. Operating system 302 also maintains a library of objects. These objects can be copied and used by various applications. For additional information, including information explanations of the registries in "WINDOWS98" and "WINDOWS NT", see:

a) "Inside The Microsoft Windows98® Registry" by Gunter Born, available from "MICROSOFT PRESS", the entire book and in particular chapters 1, 4–7 and Appendix C, pages 1–14, 119–380 and 393–421 (1998);
b) "WIN 98 Registry Little Black Book" by Greg Holden, available from the Coriolis Group of International Thomson Publishing Company, the entire book and in particular pages 1–40, 95–159, 191–297 and 323–339 (1998); and
c) "Microsoft WindowsNT® Workstation Resource Kit," available from "MICROSOFT PRESS", the entire book and in particular pages 797–910 (1996).

The subject matter of these documents is incorporated herein by reference.

In accordance with the present invention, registry 308 also includes multiple "identities" 309 and 310, a CURRENT_IDENTITY subkey 311, and an object called the "identity manager object" 312. CURRENT_IDENTITY subkey 311 has a value that points to the one of the "identities" that is the current identity. Each identity includes an identity name, an optional identity password, and an identity identifier. The identity identifier is stored as a Globally Unique Identifier (GUID) in accordance with a conventional identification scheme in which only one name is associated with a particular object. Each identity also typically includes other work-environment information that can be used by identity-aware applications. The remaining elements of FIG. 3 are described in connection with FIGS. 4, 5, and 6.

Figure 4:
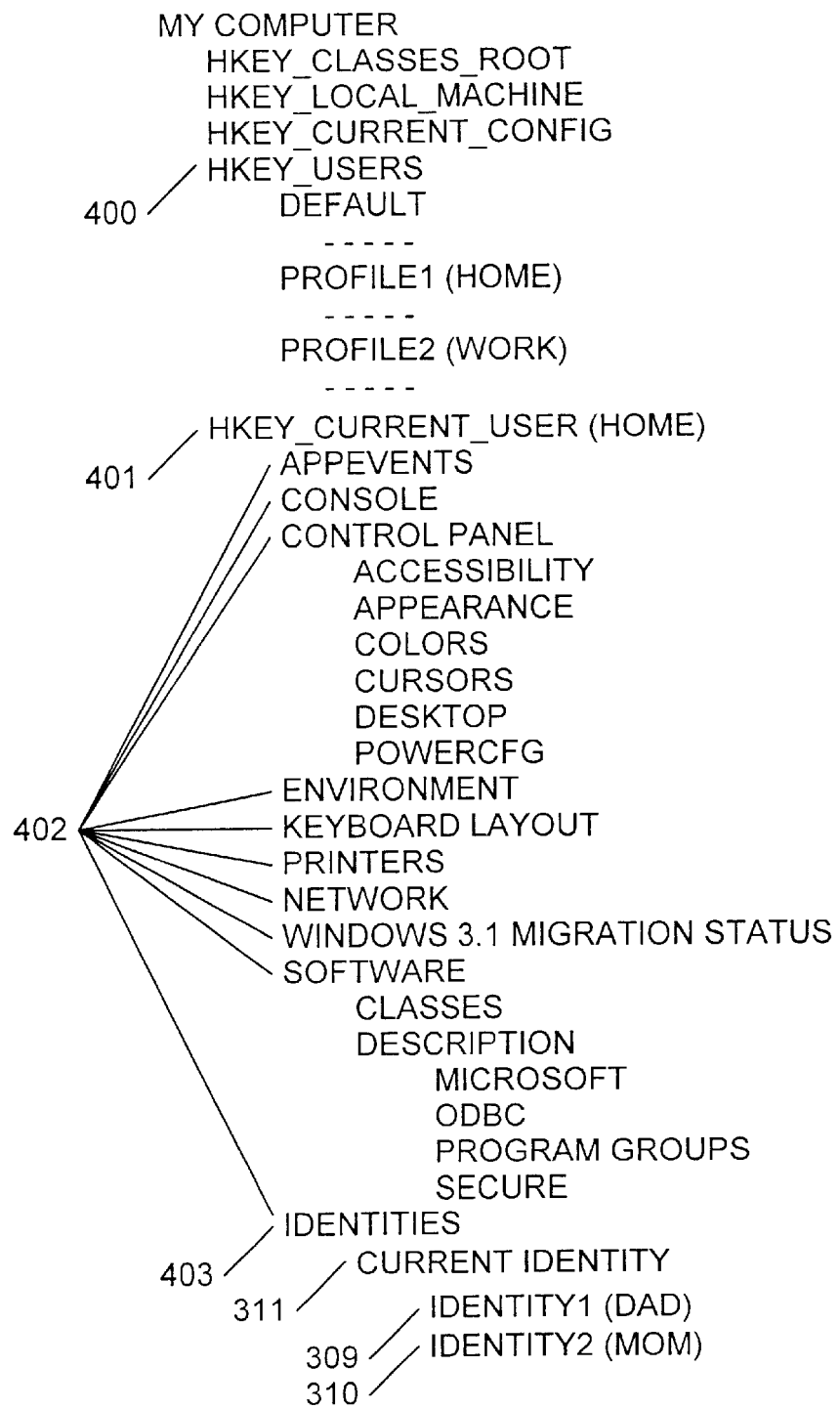
FIG. 4 is a simplified diagram of the registry in the system of FIG. 3.

FIG. 4 is a simplified diagram of one embodiment of registry 308. Registry 308 is a hierarchical database of user and system information. A basic unit of information in the registry is called a "key." Within each "key" there are smaller units of information called "subkeys." One of the keys, key 400 (the HKEY_USERS key) contains all the user profiles. The subkey DEFAULT is the subkey for a default profile. In this example, the subkey PROFILE1 is the subkey for a first profile and the subkey PROFILE2 is the subkey for the second profile. Registry 308 also has another key, key 401 (the HKEY_CURRENT_USER key), the value of which points to the one of the HKEY_USERS subkeys (profiles) that is currently in use. HKEY_CURRENT_USER 401 contains numerous subkeys 402, one of which is the IDENTITIES subkey 403. The IDENTITIES subkey 403 contains the CURRENT_IDENTITY 311 and an individual subkey 309 and 310 for each configured identity. In this example, IDENTITY1 is identity 309 in FIG. 3 and IDENTITY2 is identity 310 in FIG. 3. CURRENT_IDENTITY 311 is a value that points to the one of these two identities 309 and 310 that is currently in use. If no identity is selected for use, then the system is in the "non-identity state" and CURRENT_IDENTITY subkey 311 points to no identity.

Figure 5:
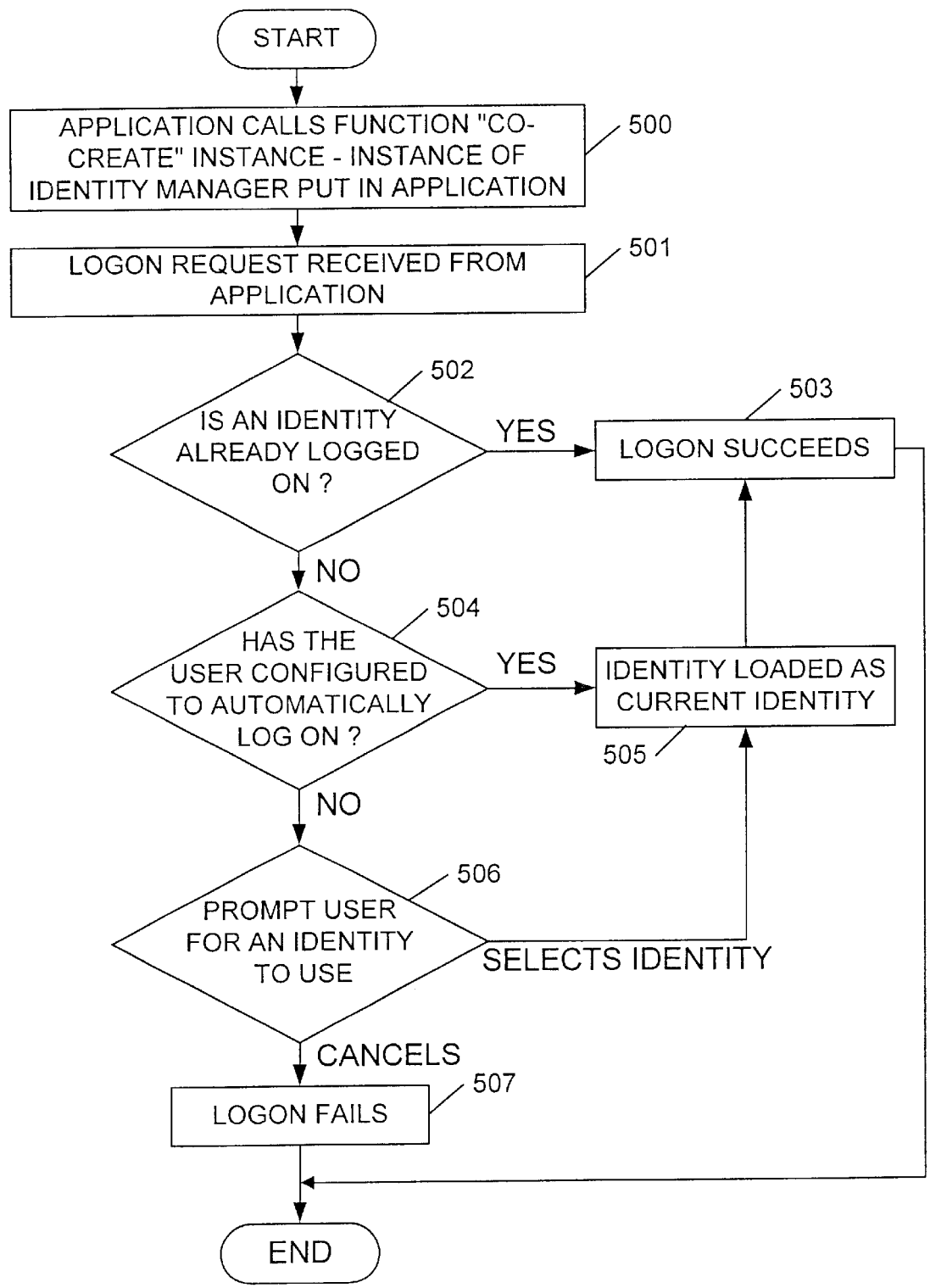
FIG. 5 is a flowchart of an "identity-manager logon process" in accordance with some embodiments of the invention.

FIG. 5 is a flowchart of an "identity-manager logon process" that executes when an identity-aware application opens. The flowchart is explained in connection with the computer system of FIG. 3.

Application 300 (FIG. 3) is an identity-aware application. When application 300 opens, application 300 causes an instance 313 of the identity manager object 312 in registry 308 to be created and placed into application 300 (step 500). Application 300 does this by calling a conventional operating-system function called "CoCreateInstance" and passing to it the GUID of identity manager object 312 in the registry. The "CoCreateInstance" function makes a copy of the identity manager object 312 and puts the copy, identity-manager instance 313, in application 300. Identity-manager instance 313 includes a group of functions that do not execute by themselves, but rather must be called in order to execute.

Next (step 501), application 300 issues a logon request to identity-manager instance 313. In response, identity manager instance 313 accesses the CURRENT_IDENTITY subkey 311 of the current profile in registry 308 (step 502). If the CURRENT_IDENTITY subkey 311 points to an identity, then the logon succeeds (step 503) and the application opens with a work-environment based on the current identity. If there is no active identity, then identity-manager instance 313 checks the IDENTITIES subkey to determine whether the registry has been loaded with a predetermined logon identity that will be automatically loaded on logon (step 504). If the registry has been loaded with such a predetermined logon identity, then identity manager instance 313 changes the CURRENT_IDENTITY subkey 311 (step 505) to point to the predetermined logon identity and the logon succeeds (step 503).

If, in step 504, registry 308 is found to contain no predetermined identity, then identity-manager instance 313 prompts the user (step 506) for an identity to use in configuring application 300. The user may then either specify an identity to be loaded as the current identity (step 505) or may cancel the logon process (step 507). If cancelled, the logon process fails and application 300 does not open. Alternatively, application 300 opens in the "non-identity" state but the application cannot save data until an identity has been chosen using the logon process. Once the logon process is completed, the application can, via its identity-manager instance, retrieve information from and store information in the current identity section of the registry. The application can also ask the identity manager instance for special directories in the file system that are reserved for the current identity.

Figure 6:
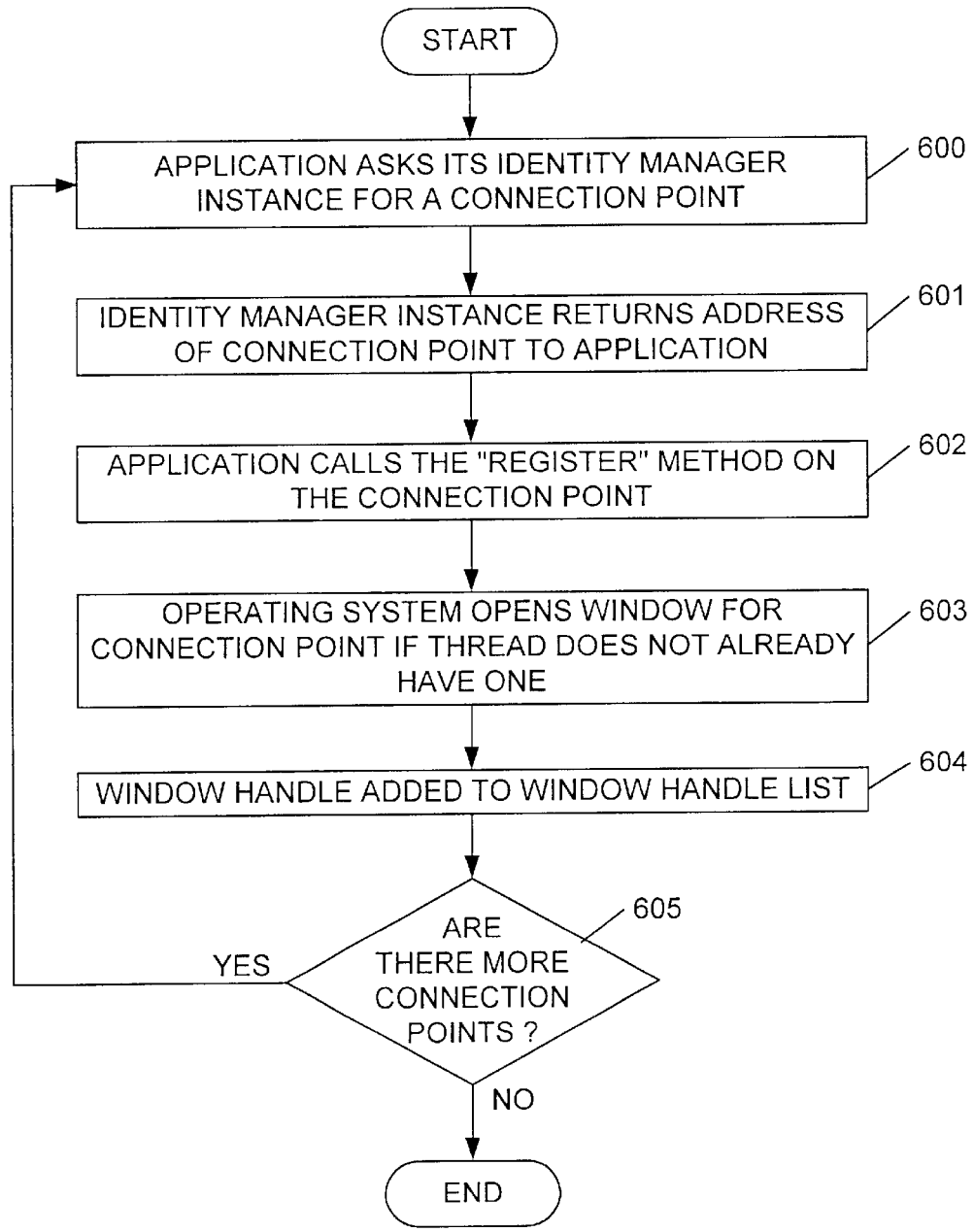
FIG. 6 is a flowchart of a "connection-point registration process" in accordance with some embodiments of the invention.

FIG. 6 is a flowchart of a "connection point registration process" that an identity-aware application can initiate after logging on. Applications that register using this process (i.e., identity-aware applications) will receive notifications when a user tries to:

a) switch identities, b) change information about the identity (e.g., the identity name), c) remove identities, and/or d) logoff the current identity without switching to a new identity.

Different sections of a given application can be registered to receive these notifications. For example, each thread of a multi-threaded application might be registered to receive notifications so that each thread can respond appropriately when the user tries to switch identities.

Identity manager objects (e.g., 313) establish individual registrations for notifications using "connection points," which are conventional objects used to establish program interfaces. Each connection point used in accordance with the invention includes software routines and data. The data in a connection point may include information that identifies a dedicated connection-point window used for communication with the connection point. The connection point also includes function pointers that can be called to execute operating system functions. For a detailed description of connection points, see "Inside COM—Microsoft's Component Object Model" by Dale Rogerson, available from "MICROSOFT PRESS", the entire book and especially pp. 355–358 (1997) (the subject matter of this document is incorporated herein by reference).

Consider the registration process for application 300 of FIG. 3. In a first step (step 600), application 300 asks its identity-manager instance 313 for a connection point. Next (step 601), identity manager instance 313 returns the address of a connection point 314 to application 300. Application 300 responds by calling the "register" method on connection point 314 (step 602). If a window is not already open for thread 303, the thread associated with connection point 314, then the connection point calls an operating system function to open a window (step 603) that will be used to communicate with connection point 314. In the present example, this communication window is window 319.

A window is a data structure maintained by the operating system that can be used to communicate between processes. Identity manager instance 313 in application 300 can, for example, communicate with threads 305 and 306 in another application 301 using windows. Windows may be visible (such as are seen on the computer screen when using the "WINDOWS" operating system) or may be invisible. Both types of windows are usable to pass information to the process controlling the window. Operating system 302 maintains a list 307 of handles to all windows that are open on the entire system. Window 319, created in step 603 to communicate with connection point 314, therefore has a handle that appears in the window handle list 307. When the operating system 302 places the handle of window 319 in window handle list 307 (step 604), then connection point 314 is said to be "registered."

Processing continues to step 605. If it is determined in step 605 that there are more connection points to be registered, then processing returns to step 600 and the other connection points 315–318 of the application are registered.

If, on the other hand, it is determined in step 605 that there are more connection points to be registered, then processing concludes. This connection point registration process is executed for each application that is opened on the system so that all connection points of all applications are registered. The global list of handles 307 therefore contains handles for all the connection point windows 319–322.

After the registration process of FIG. 6 is completed, application 300 is available for use. In the example where application 300 is "OUTLOOK" Express, a first user can retrieve and read his mail. The particular mail retrieved is determined by address information stored in the one of the identities 309 and 310 that is pointed to by the CURRENT_IDENTITY subkey 311 in registry 308. "OUTLOOK" Express uses this address information to retrieve the mail of the first user rather than the mail of someone else. If a second user later wishes to use the same "OUTLOOK" Express application 300 to read the mail of the second user, then the second user changes the CURRENT_IDENTITY subkey 311. When the second user then attempts to read her mail after having changed the current identity, "OUTLOOK" Express will use the updated CURRENT_IDENTITY subkey 311 of registry 308 to access the mail of the second user rather than the mail of the first user.

Figure 7:
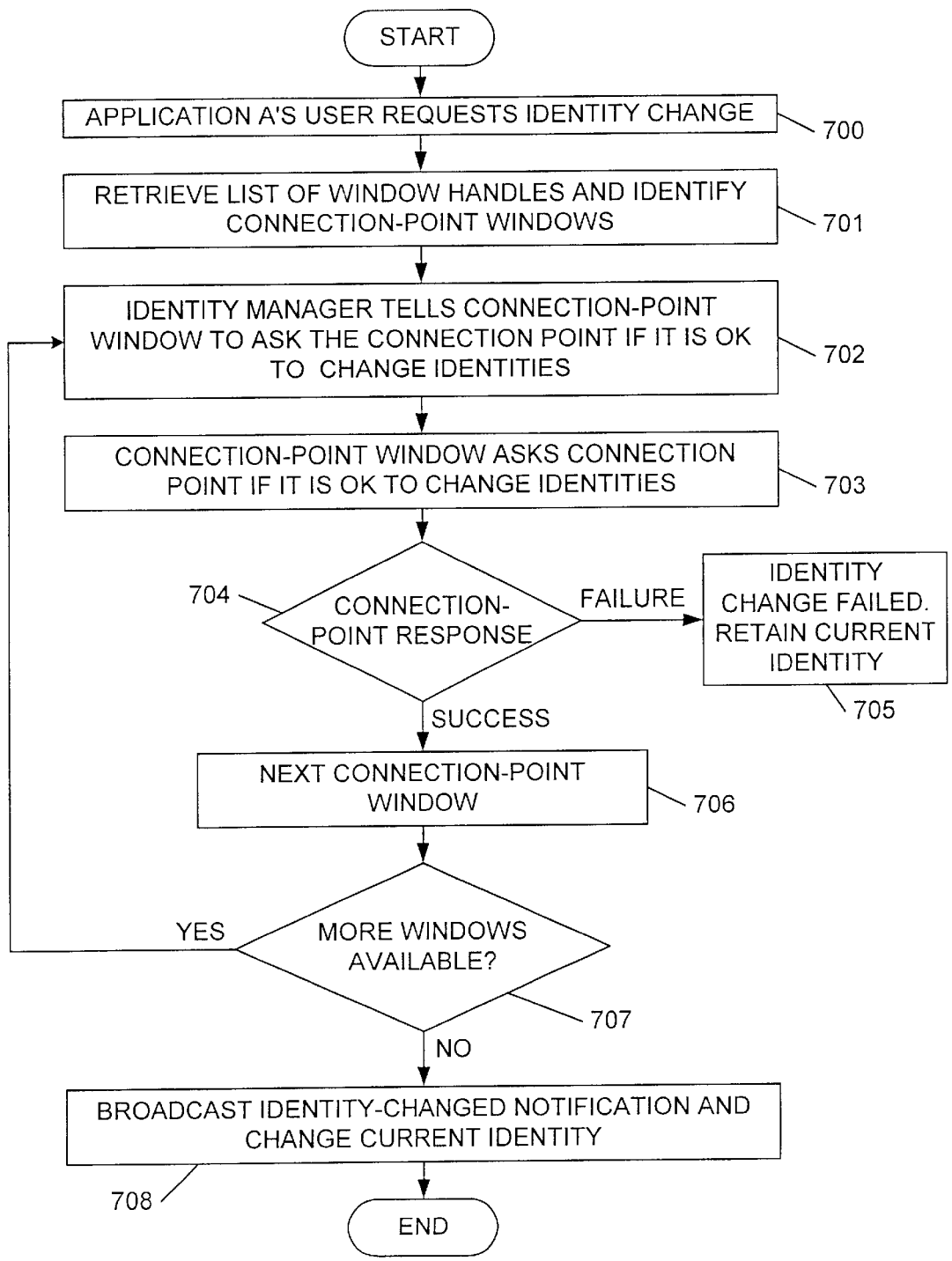
FIG. 7 is a flowchart of an "identity-change process" in accordance with some embodiments of the invention.

FIG. 7 is a flowchart of a "change-identity process" that changes the CURRENT_IDENTITY subkey 311. In step 700, the user requests an identity change from the identity manager instance in that application. This may be accomplished, for example, by selecting a "switch identity" menu item appearing on the screen of the application and then responding to a logon dialog or selecting a menu item. Alternatively, this could be accomplished by selecting a "change identity" option in the startup menu of the operating system taskbar. Next, the identity manager instance of the application responds (step 701) by retrieving the list 307 (FIG. 3) of window handles from operating system 302. The identity manager instance then steps through list 307 one handle at a time to determine if each window still exists and if so to query it for permission to switch.

In the example of FIG. 7, application 300 received the request to change identities. The identity manager instance 313 of application 300 starts with the first window 319 of handle list 307. In step 702, identity manager instance 313 determines whether window 319 still exists. If it does, then identity manager instance 313 sends a synchronous "WM_QUERY_IDENTITY_CHANGE" message to window 319. In response, window 319 (step 703) calls a method on connection point 314 called "QuerySwitchIdentities." This method then checks with a known location in thread 303 to determine whether it is okay with thread 303 to switch identities. The method returns a value (step 704) to window 319 indicating whether thread 303 granted or refused permission to switch identities. Window 319 then forwards a message relaying the grant or refusal of permission to identity manager instance 313.

If application 300 refuses to grant permission, the current identity will not switch (step 705). There may be many reasons why an application would refuse to switch identities. Some of these include:

a) A dialog is up in front of a connection point window. Because the connection point cannot force the dialog to go away, it would not be able to switch identities.

b) A window associated with the connection point includes data that has not been saved. The user might be prompted for a location to save the data. If the user clicks on a cancel button, then the user has indicated a desire not to have the switch of identities continue.

c) An application is in the process of performing an operation that cannot be cancelled. In such a case, the application should notify the user and then return an error so that the identity switch is cancelled.

If, on the other hand, connection point 314 returns an "okay to switch" value in step 704, then processing continues (step 706) to the window of the next connection point. In the example of FIG. 3, connection points 314 and 315 share the same window 319 because both connection points 314 and 315 are connected to the same thread 303. There is only one connection-point window per thread.

In step 707 it is determined whether there are more connection points to query. If there are more connection points to query, then processing continues to step 702. In this way, identity manager instance 313 uses the list of window handles 307 to call the "QuerySwitchIdentities" method on all the registered connection points. Connection points 316–318 are queried via window 320, connection point window 323 is queried via window 321, and connection points 324 and 325 are queried via window 322.

If step 707 determines that there are no more connection points to query, then processing continues to step 708. Identity manager instance 313 changes the CURRENT_IDENTITY subkey 311 in registry 308 so that it points to the new identity, "Identity 2" 310. After changing identities, identity manager instance 313 broadcasts an asynchronous "SwitchIdentities" message to all connection points 314–318 and 323–325 in all applications through the associated windows 319–322 to notify each application, via associated connection points, that there has been a change to the registry. Broadcasting the "SwitchIdentites" message in step 708 alerts applications 300 and 301 to whatever is necessary to reflect this change. Generally this includes:

a) closing files pertaining to the old identity, accessing registry 308 and determining from the CURRENT_IDENTITY subkey 311 what the new current identity is, b) retrieving identity-specific information stored in the registry under the new identity, and c) using that identity-specific information to configure the application as the new identity-specific information specifies.

In the example where application 300 is "OUTLOOK" Express, such identity-specific information may include address information on how to access the mail of the new user. Accordingly, after the CURRENT_IDENTITY subkey 311 is changed to the second user, an attempt of the second user to retrieve mail will result in the retrieval the mail of the second user.

Because such a change of identities occurs within a single profile, the profile being used by the applications is not changed. A closing of applications mandated by a change of profiles therefore does not occur. All applications can remain open when a change in identities occurs. In the example where the first application 300 is "OUTLOOK" Express that operates on "WINDOWS NT", the loss of a network connection due to a profile change does not occur. Unlike the example where "OUTLOOK" Express operates on the Apple operating system, the change of identity changes the identity-specific settings in the registry that are used by both applications 300 and 301. Moreover, not all applications need to register. Applications that do not use user-specific information (for example, a calculator application) would not register and would not be affected by a change of identities.

Figure 8:
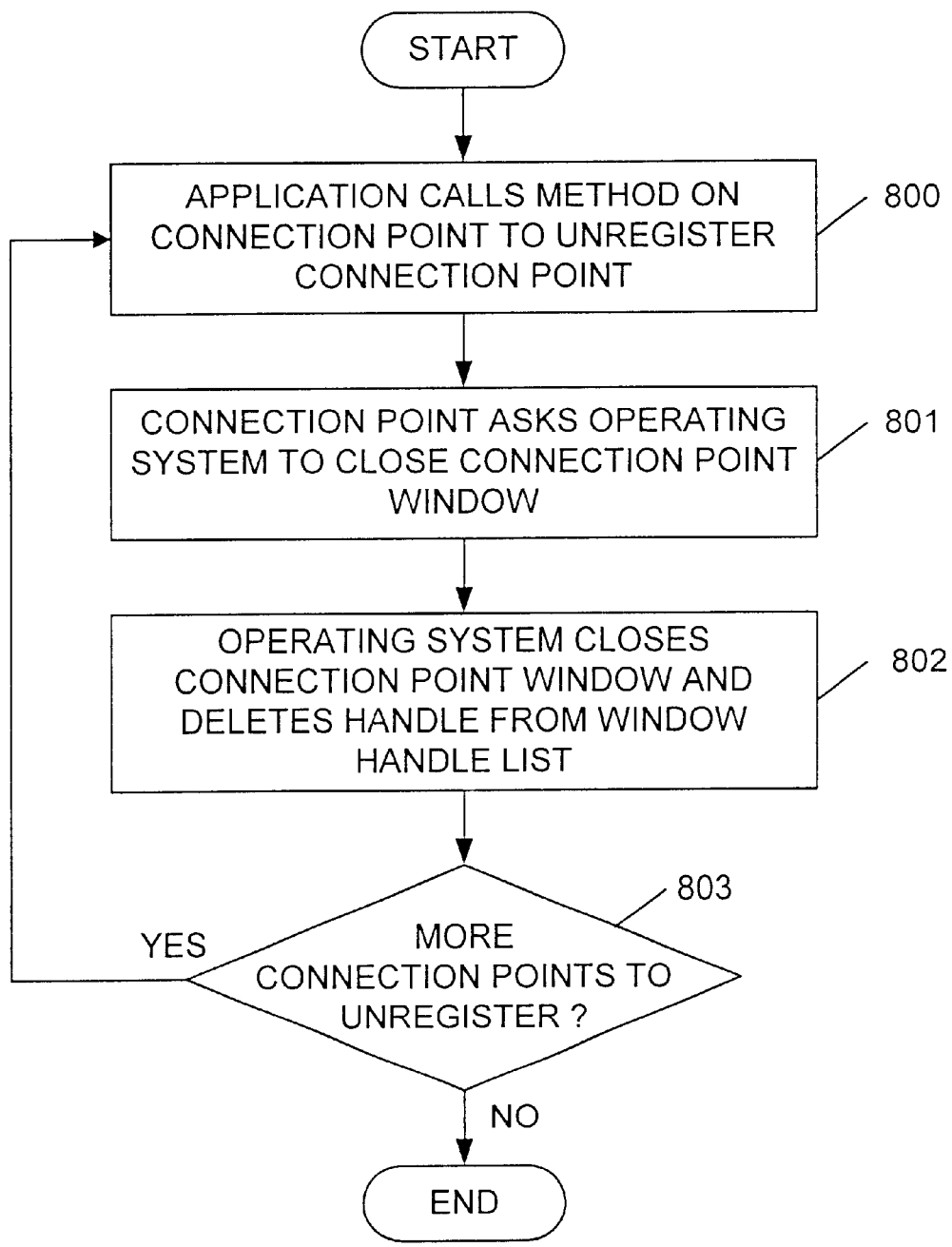
FIG. 8 is a flowchart of a "connection-point unregistration process" in accordance with some embodiments of the invention.

FIG. 8 is a flowchart of a "connection-point unregistration process." When an identity-aware application is closed, all its connection points are "unregistered" in this unregistration process. Prior to closing, the application calls a method on each connection point (step 800) to have the connection point unregister. The connection point then asks the operating system (step 801) to close the associated connection point window. When the operating system closes the associated window (step 802), the operating system also automatically removes the handle from window handle list 307 (FIG. 3). If it is determined (step 803) that the application has more connection points to unregister, then processing returns to step 800. If the application has no more connection points to unregister, then the unregistration process concludes and the application closes.

Figure 9:
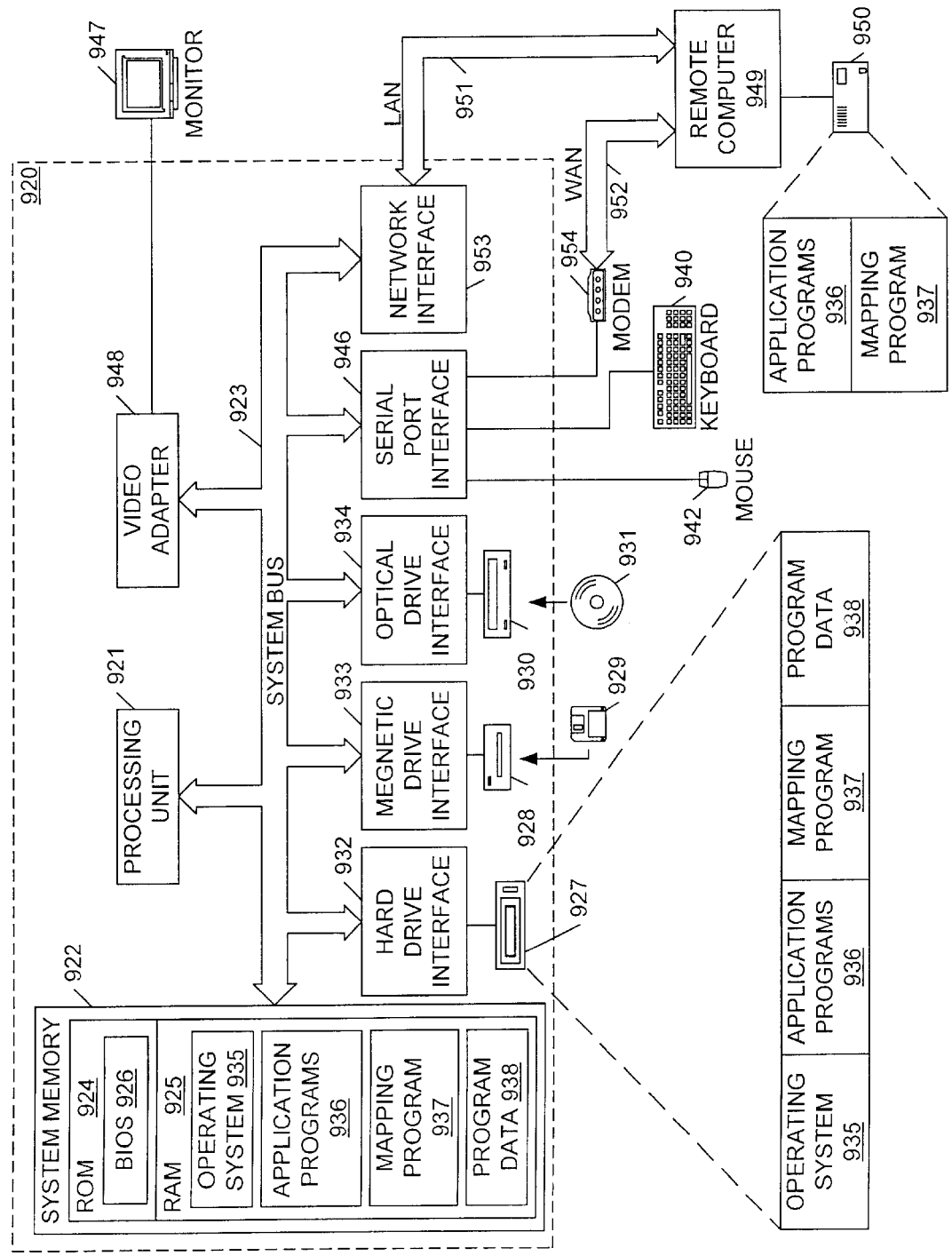
FIG. 9 is a diagram of a computing environment in which the invention may be employed.

EXEMPLARY OPERATING ENVIRONMENT: FIG. 9 and the following discussion are intended to provide a brief, general description of a suitable computing environment in which the invention may be implemented. Although not required, the invention is described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 9, an exemplary computing system for implementing the invention includes a general purpose computing device in the form of a conventional personal computer 920, including a processing unit 921, a system memory 922, and a system bus 923 that couples various system components including the system memory to the processing unit 921. The system bus 923 may be any of several types of bus structures, including a memory bus or memory controller, a peripheral bus, and a local bus using any of a variety of bus architectures. The system memory includes read only memory (ROM) 924 and random access memory (RAM) 925. A basic input/output system 926 (BIOS), containing the basic routines that help to transfer information between elements within the personal computer 920, such as during start-up, is stored in ROM 924. The personal computer 920 further includes a hard disk drive 927 for reading from and writing to a hard disk, not shown, a magnetic disk drive 928 for reading from or writing to a removable magnetic disk 929, and an optical disk drive 930 for reading from or writing to optical disk 931 such as a CD ROM or other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of computer readable instructions, data structures, program modules and other data for the personal computer 920. Although the exemplary environment described herein employs a hard disk, a removable magnetic disk 929 and a removable optical disk 931, it should be appreciated by those skilled in the art that other types of computer readable media which can store data that is accessible by a computer, such as magnetic cassettes, flash memory cards, digital video disks, Bernoulli cartridges, random access memories, read only memories, and the like, may also be used in the exemplary operating environment.

A number of program modules may be stored on the hard disk, magnetic disk 929, optical disk 931, ROM 924 or RAM 925, including an operating system 935, one or more application programs 936, other program modules 937, and program data 938. A user may enter commands and information into the personal computer 920 through input devices such as a keyboard 940 and pointing device 942. Other input devices (not shown) may include a microphone, joystick, game pad, satellite dish, scanner, or the like. These and other input devices are often connected to the processing unit 921 through a serial port interface 946 that is coupled to the system bus, but may be connected by other interfaces, such as a parallel port, game port or a universal serial bus (USB). A monitor 947 or other type of display device is also connected to the system bus 923 via an interface, such as a video adapter 948. In addition to the monitor, personal computers typically include other peripheral output devices (not shown), such as speakers and printers.

The personal computer 920 may operate in a networked environment using logical connections to one or more remote computers, such as a remote computer 949. The remote computer 949 may be another personal computer, a server, a router, a network PC, a peer device or other common network node, and typically includes many or all of the elements described above relative to the personal computer 920, although only a memory storage device 950 has been illustrated in FIG. 9. The logical connections depicted in FIG. 9 include a local area network (LAN) 951 and a wide area network (WAN) 952. Such networking environments are commonplace in offices, enterprise-wide computer networks, intranets and the Internet.

When used in a LAN networking environment, the personal computer 920 is connected to the local network 951 through a network interface or adapter 953. When used in a WAN networking environment, the personal computer 920 typically includes a modem 954 or other means for establishing communications over the wide area network 952, such as the Internet. The modem 954, which may be internal or external, is connected to the system bus 923 via the serial port interface 946. In a networked environment, program modules depicted relative to the personal computer 920, or portions thereof, may be stored in the remote memory storage device. It will be appreciated that the network connections shown are exemplary and other means of establishing a communications link between the computers may be used.

Although the present invention is described in connection with certain specific embodiments for instructional purposes, the present invention is not limited thereto. Applications that can register with an identity manager in accordance with the present invention also include "MSN" Messenger Service available from Microsoft Corporation, Internet Explorer available from Microsoft Corporation and Passport available from Microsoft Corporation. Identities and identity managers can be employed in operating systems other than the "WINDOWS98" and "WINDOWS NT" operating systems. Identities can be implemented in registries that do not implement profiles. The identity manager and registry can be stored on a computer-readable medium. Examples of computer-readable mediums include magnetic and optical storage media and semiconductor memory. The computer system may be a single stand-alone computer, as described above, or may be a number of computers on a network. The multitasking computer system may be, for example, a cooperative multitasking system or a preemptive multitasking system. Accordingly, various modifications, adaptations, and combinations of various features of the described embodiments can be practiced without departing from the scope of the invention as set forth in the claims.

What is claimed is:

1. A method comprising:
    a. running a first application and a second application on a computer system using a current identity of a user of the computer system, the current identity defining a plurality of work-environment settings, the current identity being used by both the first application and the second application, the current identity being a first identity, the first and second applications running substantially simultaneously on a multitasking computer system;
    b. receiving a request to change the current identity;
    c. obtaining permission from the first application and the second application to change the current identity; and
    d. changing the current identity so that the first application uses a second identity rather than the first identity without closing the first application, and so that the second application uses the second identity rather than the first identity without closing the second application.

2. The method of claim 1, wherein the first application has a user interface, the user interface of the first application being configured in a first way when the first application uses the first identity in (a), the user interface of the first application being configured in a second way when the first application uses the second identity in (d).

3. The method of claim 1, wherein the computer system includes a computer, the computer having an operating system, the first and second identities being stored in a registry maintained by the operating system.

4. The method of claim 2, wherein a profile is stored in the registry, wherein the first application and the second application run in (a) using the profile, and wherein the current identity is changed in (d) without changing the profile, the first and second applications using the same profile throughout (a), (b), (c) and (d).

5. The method of claim 1, wherein the running of the first application in (a) involves communication across a dial-up connection when the first application is using the first identity, wherein the dial-up connection is not lost when the current identity is changed in (d), the first application communicating across the dial-up connection in (d) while using the second identity.

6. The method of claim 1, wherein (c) further comprises:
    i. obtaining permission from the first application via a first connection point; and
    ii. obtaining permission from the second application via a second connection point.

7. The method of claim 1, further comprising:
    e. creating a first connection point for communication with the first application;
    f. opening a first window corresponding to the first connection point;
    g. creating a second connection point for communication with the second application;
    h. opening a second window corresponding to the second connection point;
    i. sending to the first window a first message requesting permission to change identities, the permission obtained in (c) from the first application being received via the first window; and
    j. sending to the second window a second message requesting permission to change identities, the permission obtained in (c) from the second application being received via the second window.

8. A computer-readable medium having computer-executable instructions for performing the steps of:
    a. querying a first application for permission to switch identities of a user of a computer system, the first application using a first identity of a user of the computer system, the first identity being a part of a registry, the first identity being first values of work-environment settings;
    b. querying a second application for permission to switch identities, the second application using the first identity, the first and second applications executing substantially simultaneously on a multitasking computer system; and
    c. if both the first application and the second application grant permission to change identities, modifying the registry such that the first application uses a second identity of a user of the computer system rather than the first identity and such that the second application uses the second identity rather than the first identity, the first and second applications switching from using the first identity to using the second identity without either the first application or the second application being closed, the second identity being a part of the registry, the second identity being second values of work-environment settings.

9. The computer-readable medium of claim 8, wherein the registry contains a current identity pointer that points to one of the first identity and the second identity.

10. The computer-readable medium of claim 8, wherein the registry contains an identity manager object.

11. The computer-readable medium of claim 8, wherein the querying of step (a), the querying of step (b) and the modifying of step (c) is performed by an identity manager, the identity manager querying the first application in step (a) through a first connection point, the identity manager querying the second application in step (b) through a second connection point, the first application granting permission to change identities to the identity manager via the first connection point prior to the modifying of step (c), the second application granting permission to change identities to the identity manager via the second connection point prior to the modifying of step (c).

12. The computer-readable medium of claim 8, wherein the computer-executable instructions are also for performing the steps of:
    a. notifying the first application via the first connection point that the registry has been modified; and
    b. notifying the second application via the second connection point that the registry has been modified.

* * * * *